United States Patent
Zhan

(10) Patent No.: US 8,749,608 B2
(45) Date of Patent: Jun. 10, 2014

(54) METHOD AND APPARATUS FOR ARRANGING AGENT OF CALL CENTER

(75) Inventor: Shengmin Zhan, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 13/466,220

(22) Filed: May 8, 2012

(65) Prior Publication Data

US 2012/0218372 A1   Aug. 30, 2012

Related U.S. Application Data

(63) Continuation of application No. PCT/CN2011/071284, filed on Feb. 25, 2011.

(30) Foreign Application Priority Data

Apr. 19, 2010  (CN) .......................... 2010 1 0154141

(51) Int. Cl.
*H04N 7/14* (2006.01)
*H04M 3/523* (2006.01)

(52) U.S. Cl.
CPC .............. *H04N 7/14* (2013.01); *H04M 3/5232* (2013.01); *H04M 3/5235* (2013.01)
USPC .................... 348/14.01; 379/265.13

(58) Field of Classification Search
CPC . H04M 3/5125; H04M 3/523; H04M 3/5233; H04M 3/51; H04M 3/5183; H04M 3/5191; H04M 3/5237; H04M 3/5232; H04N 7/14

USPC ........... 348/14.01, 14.11, 14.12; 379/265.01, 379/265.09, 265.12, 265.13, 266.02, 266.03
See application file for complete search history.

(56) References Cited

U.S. PATENT DOCUMENTS

| | | | |
|---|---|---|---|
| 6,992,692 B2 * | 1/2006 | Gu et al. | ..................... 348/14.12 |
| 7,792,277 B2 | 9/2010 | Shaffer et al. | |
| 2002/0087393 A1 | 7/2002 | Philonenko | |

(Continued)

FOREIGN PATENT DOCUMENTS

| | | | |
|---|---|---|---|
| CN | 101433072 A | 5/2009 |
| CN | 101635719 A | 1/2010 |

(Continued)

OTHER PUBLICATIONS

English language International Search Report from the State Intellectual Property Office of P.R. China for International Application No. PCT/CN2011/071284 mailed Jun. 16, 2011.

(Continued)

*Primary Examiner* — Stella Woo
(74) *Attorney, Agent, or Firm* — Brinks Gilson & Lione

(57) ABSTRACT

A method for arranging an agent of a call center includes: receiving a video call request sent by a user, and determining an agent capable of providing a service for the user according to the video call request; calculating video quality of the agent capable of providing a service for the user, and obtaining a requirement of the user corresponding to the video call request; if the calculated video quality of the agent meets the requirement of the user, allocating the agent with the video quality meeting the requirement of the user to the user; otherwise, putting the user into a queue for queuing.

10 Claims, 1 Drawing Sheet

(56) References Cited

U.S. PATENT DOCUMENTS

| | | | |
|---|---|---|---|
| 2005/0195962 A1* | 9/2005 | Brown | 379/265.02 |
| 2008/0037762 A1 | 2/2008 | Shaffer et al. | |
| 2010/0054453 A1* | 3/2010 | Stewart | 379/265.12 |
| 2013/0230155 A1* | 9/2013 | Fan et al. | 379/265.09 |

FOREIGN PATENT DOCUMENTS

| | | |
|---|---|---|
| CN | 101645987 A | 2/2010 |
| CN | 101645988 A | 2/2010 |
| EP | 1111859 A2 | 6/2001 |
| EP | 1237349 A2 | 9/2002 |
| WO | WO 01/01660 A1 | 1/2001 |

OTHER PUBLICATIONS

Written Opinion of the International Searching Authority issued in corresponding PCT Patent Application No. PCT/CN2011/071284, mailed Jun. 16, 2011, 5 pages.

Office Action issued in corresponding Chinese Patent Application No. 201010154141.0, mailed Apr. 2, 2013, 16 pages.

Extended European Search Report mailed Aug. 2, 2012, issued in related European Application No. 11771511.0, Huawei Technologies Co., Ltd. (8 pages).

* cited by examiner

METHOD AND APPARATUS FOR ARRANGING AGENT OF CALL CENTER

CROSS-REFERENCE TO RELATED APPLICATIONS

This application is a continuation of International Application No. PCT/CN2011/071284, filed on Feb. 25, 2011, which claims priority to Chinese Patent Application No. 201010154141.0, filed on Apr. 19, 2010, both of which are hereby incorporated by reference in their entireties.

FIELD OF THE INVENTION

The present invention relates to the field of communications, and in particular, to a method and an apparatus for arranging an agent of a call center.

BACKGROUND OF THE INVENTION

A call center is an information system for providing multiple access means such as telephone, fax and email for users, and is mainly used to process users' requests, questions, complaints, suggestions and inquiries that are proposed to enterprises, where 114, 1000, 1860 and 12580 can be taken as examples. In a customer call center system, a computer telephony integration technology (Computer Telephony Integration, CTI) is a core device, and a routing queuing module is a core module of the CTI. A main function of the routing queuing module is to find an attendant (agent) for a user (call). With incessant development of a 3G technology, a video call service is also added into the call center. A common agent arrangement method is still adopted as an agent arrangement method for a video call, for example, an agent is arranged by adopting a first-in first-out (First-In First-Out, FIFO) policy, or an agent is arranged by adopting a policy of allocating an idle agent first.

The agent arrangement method according to the technical solution may lead to a situation that a blurry video agent is allocated to a high-end customer, and thereby fails to provide users with differentiated services.

SUMMARY

Embodiments of the present invention provide a method and an apparatus for arranging an agent of a call center, where the method and the apparatus have a feature of providing users with differentiated services.

An embodiment of the present invention provides a method for arranging an agent of a call center, where the method includes:

receiving a video call request sent by a user, and determining an agent capable of providing a service for the user according to the video call request; and calculating and determining video quality of the agent, and obtaining a requirement of the user corresponding to the video call request; allocating the agent to the user if the calculated video quality of the agent meets the requirement of the user; otherwise, putting the user into a queue for queuing, and when an idle agent meeting the requirement is available, allocating the idle agent to the user in the queue.

In some embodiments, the present invention further provides an apparatus for arranging an agent of a call center, where the apparatus includes:

a receiving unit, configured to receive a video call request sent by a user, and determine an agent capable of providing a service for the user according to the video call request;

a calculating unit, configured to calculate and determine video quality of the agent, and obtain a requirement of the user corresponding to the video call request; and an allocating unit, configured to allocate the agent to the user when the video quality of the agent calculated by the calculating unit meets the requirement of the user; otherwise, put the user into a queue for queuing, and when an idle agent meeting the requirement is available, allocate the idle agent to the user in the queue.

In view of the technical solution provided in the foregoing, in the technical solutions of the embodiments of the present invention, when agent arrangement is performed, the video quality of the agent is calculated, and the agent meeting the requirement of the user is allocated to the user. Compared with random allocation in the prior art, an advantage thereof lies in that the video quality of the agent is taken into account, so that an agent with better video quality is allocated to a high-end customer, and differentiated services are provided for users.

DETAILED DESCRIPTION OF THE EMBODIMENTS

Figure 1:
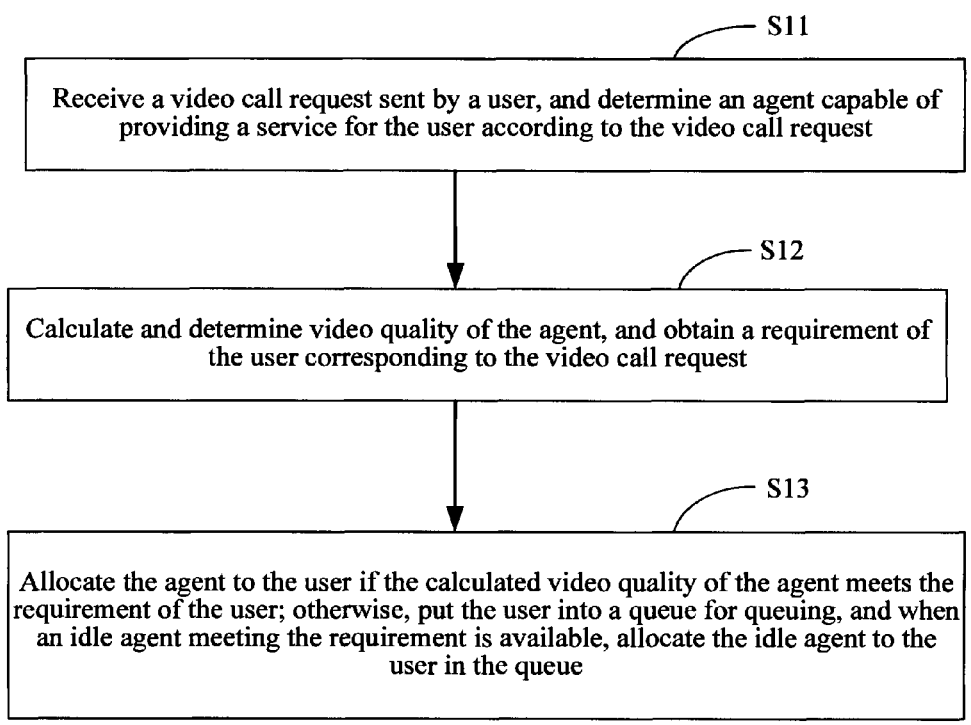
FIG. 1 is a flow chart of a method for arranging an agent of a call center according to one embodiment of the present invention.

The present invention provides a method for arranging an agent of a call center, where as shown in FIG. 1, the method includes:

S11: Receive a video call request sent by a user, and determine an agent capable of providing a service for the user according to the video call request.

The number of the determined agent(s) capable of providing a service for the user may be one or more, and the specific number is decided based on an idle video agent at the moment. At this time, as long as an agent is idle and capable of providing a video service, the agent is determined to be the agent capable of providing a service for the user.

S12: Calculate and determine video quality of the agent, and obtain a requirement of the user corresponding to the video call request.

The method for implementing S12 may specifically be as follows: a video collecting program in a computer that corresponds to the agent reads a video frame from a video collecting card, and after a video processing module in the computer that corresponds to the agent processes the video frame, a video sequence comprehensive evaluation module in the computer evaluates the video frame, and determines the video quality of the agent according to an evaluation result of the video frame.

Optionally, the method for the video evaluation may specifically be determining the video quality according to a pixel change of a preset area in an adjacent frame of a video sequence, where the preset area may be any area that the user selects from the video frame, and, may be a preset area determined through calculation, for example, a moving object area described in the following. The method specifically includes the following: first, the video sequence collected by the video collecting card of the computer that corresponds to the agent arrives at the computer, and the video processing module determines a motion vector field of a video frame (which is selected randomly) in the video sequence; then, the video sequence comprehensive evaluation module determines a moving object area (equivalent to the preset area) in the video frame according to the motion vector field of the video frame; a square average value of pixel differences between the moving object area in the video frame and a corresponding area in a frame previous to the video frame (an area the same as the moving object area) is calculated; and the video sequence is evaluated according to the calculated square average value, and the video quality is obtained according to an evaluation result. The method for evaluating the video sequence according to the square average value may specifically be: determining the video quality of the video sequence according to the square average value of the pixel differences. For example, when it is determined that the square average value of the differences is greater than Q, it indicates that the quality of the video sequence is poor. When the square average value of the differences is less than P, it is determined that the quality of the video sequence is good. When the square average value of the differences is between P and Q, it is determined that the quality of the video sequence is medium. Other methods in the prior art may be adopted as the video evaluation method, and the video evaluation method is not limited in the present invention.

A practical example is taken to illustrate the video frame evaluation method in the following. A video frame 2, a video frame selected from the video sequence, is taken as an example for illustration. A video collecting card in the computer that corresponds to the agent collects a video sequence. A video processing module extracts the video frame 2 in the video sequence, and determines a motion vector field of the video frame 2. Finally, a video sequence comprehensive evaluation module determines a moving object area of the video frame 2 according to the motion vector field, and calculates a square average value of pixel differences between the moving object area in the video frame 2 and a corresponding area in a video frame 1 (that is, an area the same as the moving object area in the video frame 2). The video sequence is evaluated according to the calculated square average value, and corresponding video quality is obtained according to an evaluation result. For the method for evaluating the video sequence according to the square average value, reference may be made to the description in the previous paragraph.

Optionally, multiple methods for collecting the video frame are available, for example, collecting the video frame of the agent by using a camera and a video collecting card.

S13: Allocate the agent to the user if the calculated video quality of the agent meets the requirement of the user; otherwise, put the user into a queue for queuing, and when an idle agent meeting the requirement is available, allocate the idle agent to the user in the queue.

The requirement of the user may specifically be that the video quality is required to be high-level, medium-level or low-level. If a level of the video quality of the agent is higher than or equal to the requirement of the user, it is determined that the requirement of the user is met; otherwise, the requirement of the user is not met.

Alternatively, the requirement of the user may be determined according to a priority of the user. If the priority of the user is high, the corresponding requirement is high-level. If the priority of the user is low, the corresponding requirement is low-level. Other methods may also be adopted to determine the requirement of the user, for example, performing the determination according to a service brand used by the user. If the user is a G3 user, the corresponding requirement is high-level, if the user is an M-zone user, the corresponding requirement is low-level, and so on. The specific manner for determining the requirement of the user is not limited in the specific embodiment of the present invention.

Optionally, the method for allocating the agent to the video call request in S13 may specifically be: if a single agent is determined in S11, and the video quality of the single agent meets the requirement of the user, allocating the agent to the user; if multiple agents are determined in S11 and the video quality of multiple agents meets the requirement of the user, randomly allocating an agent with the video quality meeting the requirement to the user, alternatively, allocating an agent with best video quality among the multiple agents with the video quality meeting the requirement to the user, or allocating an agent of the same video quality level to the user, for example, if the requirement of the user is high-level, allocating an agent with high-level video quality to the user, and if the requirement of the user is medium-level, allocating an agent with medium-level video quality to the user.

Optionally, after S13, the method may further include any one of the following steps:

Step A: If the user queues for a period longer than a set threshold, decrease the requirement of the user that then continues queuing.

Optionally, the requirement of the user may be decreased by one level. The requirement of the user may be decreased by multiple levels, or be directly decreased to the lowest level.

Step B: If the user queues for a period longer than a set threshold, allocate a currently idle video agent to the user.

The specific method for implementing step B may be: directly decreasing the requirement of the user to a level corresponding to video quality of the currently idle video agent. Step B is equivalent to decreasing the requirement of the user to the level corresponding to the video quality of the currently idle video agent, which avoids that the user waits a long time and improves sensitivity of the user. In step B, when multiple video agents are currently idle, one idle video agent may be randomly allocated to the user. An agent with highest-level video quality among the multiple idle video agents may be allocated to the user, and the specific method for allocating the agent is not limited in the present invention.

Optionally, the method for implementing step A may be as follows: Herein, a requirement of a user 1 being high is taken as an example for illustration. If the user 1 with the high requirement waits a period longer than the set threshold in the queue, the user 1 is extracted from a queue of a high priority, and the user 1 is arranged at the first place of a queue of a medium priority. In practice, arranging the position of the user 1 may also be randomly allocating the user 1 to the queue of the medium priority, or allocating the user 1 to the last place of the queue of the medium priority.

It is impossible that the requirement of the user in step A is corresponding to the user of the lowest requirement. Step A follows S11-S13, and it is clearly stated in S11 and S12 that the idle video agent is available. Therefore, the reason why the user in S13 is queuing may be that the requirement of the user is so high that no video agent meeting the requirement is able to be allocated to the user. Since the user of the lowest requirement will not queue when the idle video agent is available, it is impossible that the requirement of the user in step A is corresponding to the user of the lowest requirement.

Optionally, the specific method for decreasing the requirement of the user to the level corresponding to the video quality of the current idle agent may be:

if the number of the idle current agent is one, decreasing the requirement of the user to a level corresponding to the video quality of the agent; if the number of the current idle agents is more than one, decreasing the requirement of the user to a level corresponding to the agent with the best video quality among the multiple agents, or decreasing the requirement of the user to a level corresponding to the video quality of any agent among the multiple agents.

Optionally, the method for setting the threshold may be: setting a time threshold. If the user queues for a period longer than the time threshold, it is determined that the user exceeds the set threshold. In practice, multiple thresholds may be set, for example, setting a time threshold and a frequency threshold, and when the user queues for a period longer than the time threshold, the queuing frequency of the user is increased by 1, and when the user queuing frequency exceeds the frequency threshold, it is determined that the set threshold is exceeded. The aforementioned method for setting the threshold may be another manner, and the specific setting method is not limited in the specific embodiment of the present invention.

Step C: If a new idle agent appears, calculate video quality of the idle agent, and allocate the new idle agent to the user in the queue, where the level of the requirement of the user is not higher than that of the video quality of the new idle agent.

An example is taken to illustrate the method for allocating the new idle agent in the following. It is assumed that an idle agent 1 is available, and the video quality is high-level. Then, the idle agent 1 may be allocated to any user in the queue (it is assumed herein that the highest level of the requirement of the user is high). If the video quality of an idle agent 2 is medium-level, the idle agent 2 may be allocated to a user with a medium-level or low-level requirement in the queue.

The method for determining the new idle agent may be: if an idle agent is detected, judging whether the idle agent is the agent determined in S11, if yes, determining that the idle agent is not the new idle agent, and if no, determining that the idle agent is the new idle agent.

Optionally, step C may be performed after S13, or performed after step A.

In the method provided in an embodiment of the present invention, when agent arrangement is performed, the video quality of the agent is calculated, and the agent meeting the requirement of the user is allocated to the user. An advantage thereof lies in that the video quality of the agent is taken into account, so that an agent with better video quality is allocated to a high-end customer, and differentiated services are provided for users.

Figure 2:
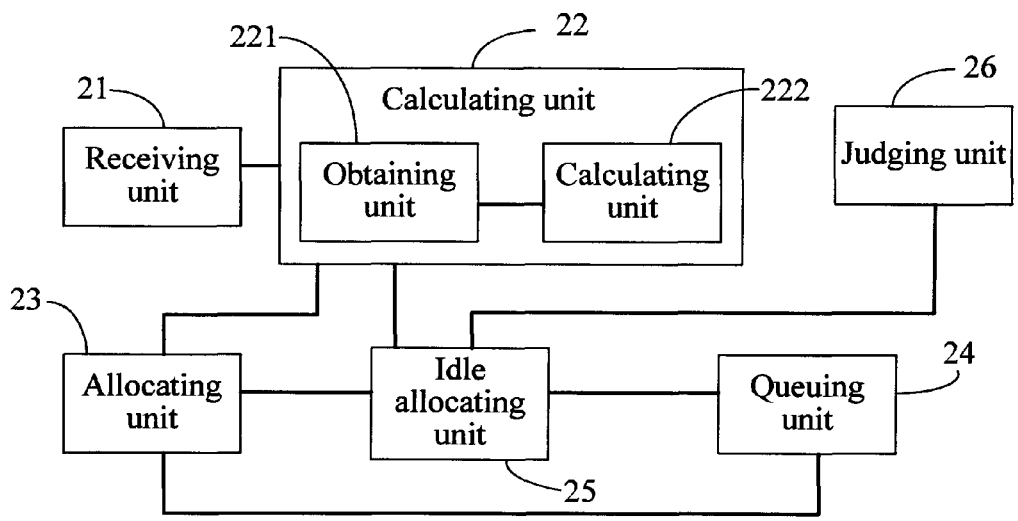
FIG. 2 is a structural diagram of an apparatus for arranging an agent of a call center according to an embodiment of the present invention.

In some embodiments, the present invention provides an apparatus for arranging an agent of a call center, where as shown in FIG. 2, the apparatus includes:

a receiving unit 21, configured to receive a video call request sent by a user, and determine an agent capable of providing a service for the user according to the video call request;

a calculating unit 22, configured to calculate and determine video quality of the agent, and obtain a requirement of the user corresponding to the video call request; and an allocating unit 23, configured to allocate the agent to the user when the video quality of the agent calculated by the calculating unit 22 meets the requirement of the user; otherwise, put the user into a queue for queuing, and when an idle agent meeting the requirement is available, allocate the idle agent to the user in the queue.

Optionally, the calculating unit 22 further includes:

an obtaining module 221, configured to obtain a video sequence corresponding to the agent and the requirement of the user corresponding to the video call request; and a calculating module 222, configured to determine the video quality according to a pixel change of a preset area in an adjacent frame of the video sequence.

Optionally, the apparatus further includes:

a queuing unit 24, configured to decrease the requirement of the user that then continues queuing or allocate a currently idle video agent to the user when the user queues for a period longer than a set threshold.

Optionally, the apparatus further includes:

an idle allocating unit 25, configured to, when a new idle agent appears during queuing, calculate video quality of the idle agent, and allocate the new idle agent to the user in the queue, where a level of the requirement of the user in the queue is not higher than that of the video quality of the new idle agent.

Optionally, the apparatus further includes:

a judging unit 26, configured to judging the new idle agent, where the judging the new idle agent specifically includes: if an idle agent is detected, judging whether the idle agent is the determined agent, if yes, determining that the idle agent is not the new idle agent, and if no, determining that the idle agent is the new idle agent.

When the apparatus provided in an embodiment of the present invention performs agent arrangement, the calculating unit calculates the video quality of the agent, and the allocating unit allocates the agent meeting the requirement of the user to the user. Compared with random allocation in the prior art, an advantage thereof lies in that the video quality of the agent is taken into account, so that an agent with better video quality is allocated to a high-end customer, and differentiated services are provided for users.

It should be understood by persons skilled in the art that the accompanying drawings are merely schematic diagrams of an exemplary embodiment, and modules or processes in the accompanying drawings are not necessarily required in implementing the present invention.

Persons of ordinary skill in the art should understand that all or a part of the steps in the method according to the embodiments of the present invention may be implemented by a program instructing relevant hardware, and the program may be stored in a computer readable storage medium. When the program is run, one or a combination of the steps of the method according to the embodiments of the present invention are performed.

In conclusion, the technical solutions provided in the embodiments of the present invention has an advantage of providing users with differentiated services.

The embodiments of the present invention are described in detail. Specific cases are used for illustrating principles and embodiments of the present invention. The above descriptions of the embodiments are merely for understanding the method and core ideas of the present invention. Meanwhile, persons of ordinary skill in the art may make modifications to the embodiments and application ranges according to the idea of the present invention. In conclusion, the content of the specification shall not be regarded as a limitation to the present invention.

What is claimed is:

1. A method for arranging an agent of a call center, wherein the method comprises:

receiving a video call request from a user, and determining one or more agents from a plurality currently idle agents as being capable of providing a service for the user according to the video call request;

receiving one or more video sequence corresponding to each respective plurality of currently idle agents, and calculating video quality of the one or more video sequence received from each of the respective plurality of currently idle agents capable of providing a service for the user; and obtaining a requirement of the user corresponding to the video call request, and if the calculated video quality of at least one of the one or more agents meet the requirement of the user:

allocating an agent from the at least one of the one or more agents with the video quality most closely meeting the requirement of the user to the user; otherwise, putting the user into a queue for queuing.

2. The method according to claim 1, wherein the calculating comprises:

determining the video quality according to a pixel change of a preset area in an adjacent frame of the video sequence.

3. The method according to claim 1, wherein after putting the user into the queue for queuing, the method further comprises:

if the user waits a period longer than a set threshold in the queue, decreasing the requirement of the user, then continues queuing or allocating a next currently idle video agent most closely meeting the decreased requirement of the user to the user.

4. The method according to claim 1, wherein after putting the user into the queue for queuing, the method further comprises:

if a new idle agent appears, calculating video quality of the new idle agent, and allocating the new idle agent to the user in the queue according to the video quality of the new idle agent, wherein a level of the requirement of the user in the queue is not higher than that of the video quality of the new idle agent.

5. The method according to claim 4, wherein a method for judging the new idle agent comprises:

if another idle agent is detected, judging whether the another idle agent is the agent capable of providing a service for the user; if yes, determining that the another idle agent is not the new idle agent, and if no, determining that the another idle agent being the new idle agent.

6. An apparatus for arranging an agent of a call center, wherein the apparatus comprises:

a receiving unit, configured to receive a video call request from a user, and determine one or more agents from a plurality currently idle agents as being capable of providing a service for the user according to the video call request;

a calculating unit, wherein upon obtaining one or more video sequence corresponding to each respective plurality of currently idle agents, configured to calculate video quality of the one or more video sequence received from each of the respective plurality of currently idle agents capable of providing a service for the user, and obtain a requirement of the user corresponding to the video call request; and an allocating unit, configured to allocate an agent from at least one of the one or more agents with the video quality most closely meeting the requirement of the user to the user, if the video quality of the at least one of the one or more agents calculated by the calculating unit meet the requirement of the user; otherwise, put the user into a queue for queuing.

7. The apparatus according to claim 6, wherein the calculating unit comprises:

an obtaining module, configured to obtain the video sequence corresponding to the agent and the requirement of the user corresponding to the video call request; and a calculating module, configured to determine the video quality according to a pixel change of a preset area in an adjacent frame of the video sequence.

8. The apparatus according to claim 6, wherein the apparatus further comprises:

a queuing unit, configured to decrease the requirement of the user, then continues queuing or allocate a next currently idle video agent most closely meeting the decreased requirement of the user to the user when the user queues for a period longer than a set threshold.

9. The apparatus according to claim 6, wherein the apparatus further comprises:

an idle allocating unit, configured to, when a new idle agent appears during queuing, calculate video quality of the new idle agent, and allocate the new idle agent to the user in the queue according to the video quality of the new idle agent, wherein a level of the requirement of the user in the queue is not higher than that of the video quality of the new idle agent.

10. The apparatus according to claim 9, wherein the apparatus further comprises:

a judging unit, configured to judge the new idle agent, wherein the judging the new idle agent comprises: if another idle agent is detected, judging whether the another idle agent is the agent capable of providing a service for the user; if yes, determining that the another idle agent is not the new idle agent, and if no, determining that the another idle agent being the new idle agent.

* * * * *